US006653823B1

(12) United States Patent
Chen

(10) Patent No.: US 6,653,823 B1
(45) Date of Patent: Nov. 25, 2003

(54) SWITCH OR CONTROL DEVICE FOR LOADED APPARATUS

(75) Inventor: Wen Lin Chen, Chong Ho (TW)

(73) Assignee: ARC Technology Co., Ltd., Taipei (TW)

(*) Notice: Subject to any disclaimer, the term of this patent is extended or adjusted under 35 U.S.C. 154(b) by 0 days.

(21) Appl. No.: 10/163,897

(22) Filed: May 31, 2002

(51) Int. Cl.[7] .......................... G05F 1/613; B60R 22/00

(52) U.S. Cl. ...................... 323/225; 307/10.4; 307/10.6

(58) Field of Search ................................ 323/225, 222, 323/370; 307/10.4, 10.5, 10.6; 340/310.01, 310.02, 825.32, 825.69, 825.7, 825.71, 825.72, 825.31

(56) References Cited

U.S. PATENT DOCUMENTS 4,236,594 A * 12/1980 Ramsperger ................ 180/167
5,473,200 A * 12/1995 Woo .......................... 307/10.2

* cited by examiner

*Primary Examiner*—Rajnikant B. Patel

(57) ABSTRACT

A control device includes a relay device coupled to a processor device, a power device coupled to the processor device and the relay device for energizing the processor device and the relay device, and a load device coupled to the relay device. A device may further be used for supplying control signals to the processor device, in order to switch on and switch off the relay device. The relay device includes two transistors coupled to the processor device, and two coils coupled to the transistors, for being actuated by the processor device with less electric power consumed.

10 Claims, 6 Drawing Sheets

SWITCH OR CONTROL DEVICE FOR LOADED APPARATUS

BACKGROUND OF THE INVENTION

1. Field of the Invention

The present invention relates to a switch or control device, and more particularly to a switch or control device for coupling to and for controlling the loaded apparatuses with less power required.

2. Description of the Prior Art

Typical remote or manual switches or control devices are coupled to the loaded apparatuses, such as the lights, the electric fans, the televisions, or the like, for switching or controlling the on and off status of the loaded apparatuses. However, the remote or manual switches or control devices may consume much power, such that the loaded apparatuses may obtain less power relatively.

The present invention has arisen to mitigate and/or obviate the afore-described disadvantages of the conventional switch or control devices.

SUMMARY OF THE INVENTION

The primary objective of the present invention is to provide a switch or control device for coupling to and for controlling the loaded apparatuses with less power required.

In accordance with one aspect of the invention, there is provided a control device comprising a processor unit, means for supplying control signals to the processor unit, a relay unit coupled to the processor unit, a power unit coupled to the processor unit and the relay unit for energizing the processor unit and the relay unit, and a load unit coupled to the relay unit, for being switch on and switch off by the relay unit with the control signals supplied to the processor unit by the supplying means.

The processor unit includes a first and a second terminals, the relay unit includes a first and a second transistors coupled to the first and the second terminals of the processor unit, for being actuated by the processor unit. The power unit may consume less electric power when the transistors are switched or actuated alternatively.

The first and the second transistors each includes a base coupled to the first and the second terminals of the processor unit respectively.

The relay unit includes a first and a second coils coupled in series between the first and the second transistors. The first and the second transistors each includes a collector coupled to the first and the second coils.

The relay unit includes a first and a second diodes coupled parallel to the first and the second coils. The first and the second diodes are preferably disposed opposite to each other.

The relay unit includes a third and a fourth terminals coupled to the load unit, and a fifth terminal coupled to the second terminal, the third and the fourth terminals are arranged to be forced and coupled together by the first transistor and the coil, and the fourth and the fifth terminals are arranged to be forced and coupled together by the second transistor and the second coil.

The control signal supplying means includes a receiver unit coupled to the processor unit, for receiving and sending the control signals to the processor unit.

The control signal supplying means may further include a switching device coupled to the processor unit, for sending the control signals to the processor unit. The switching device includes a first switch and at least one second switch coupled to the processor unit, for sending the control signals to the processor unit.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
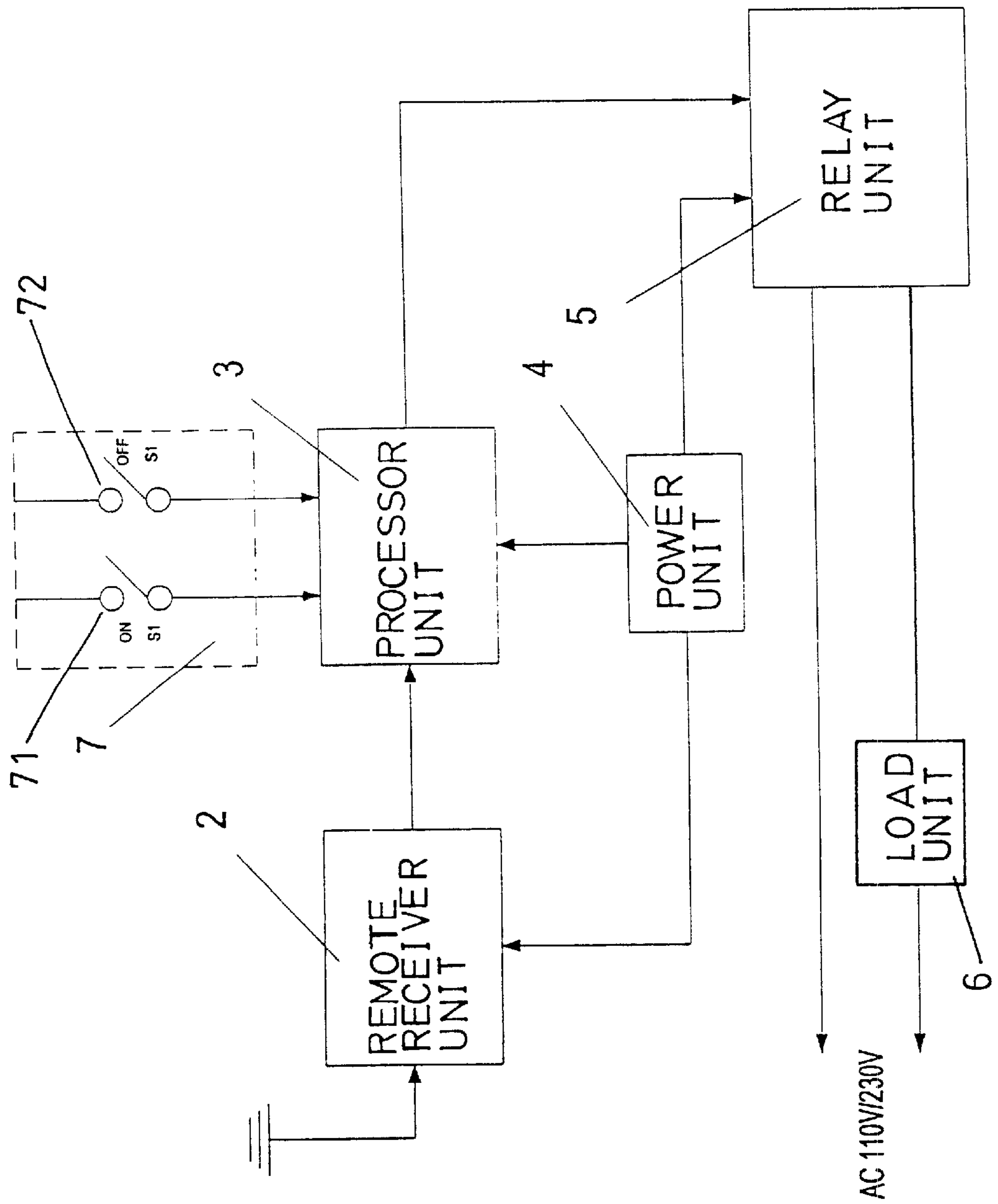
FIG. 1 is a block diagram of a switch or control device in accordance with the present invention.
Figure 2:
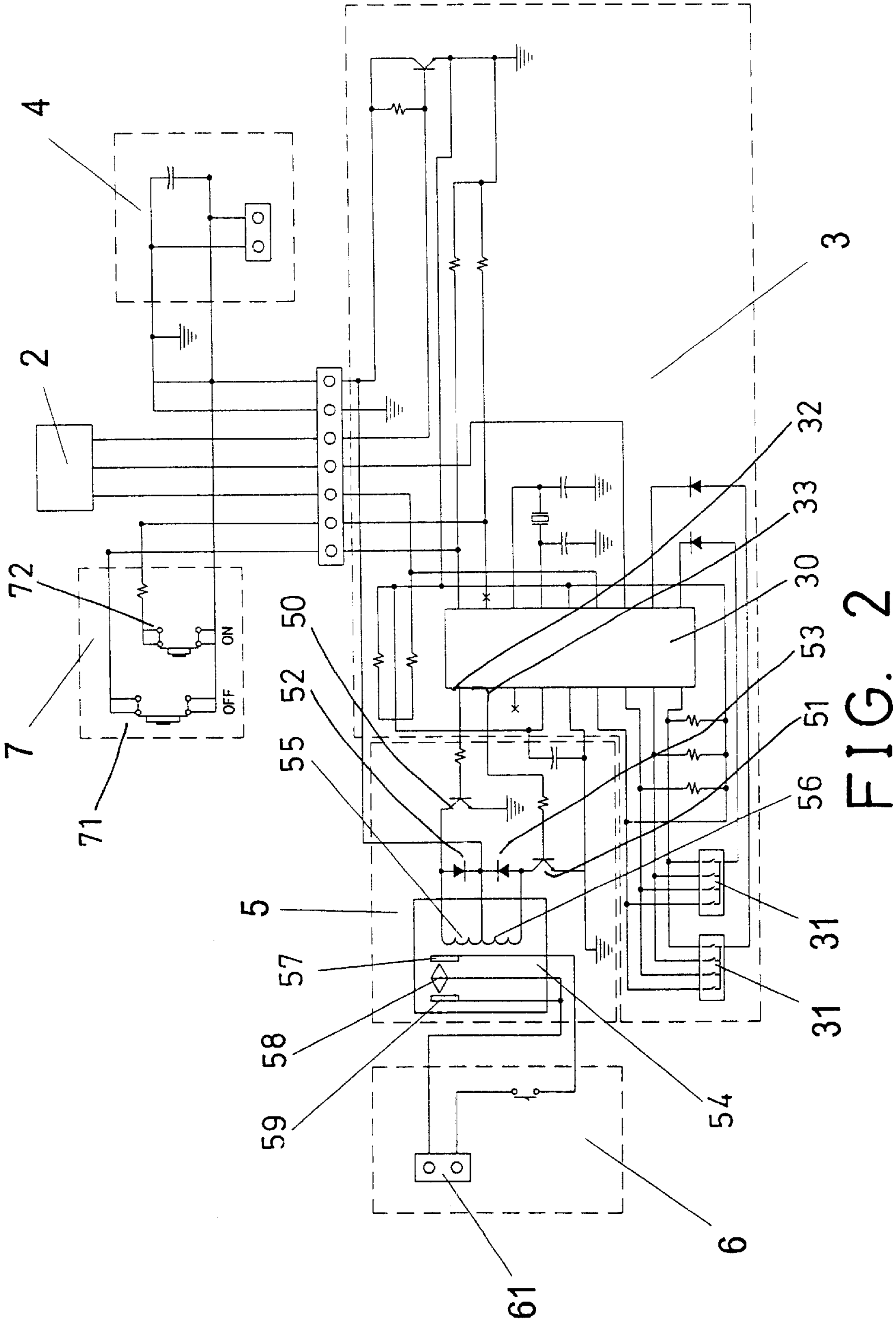
FIG. 2 is a schematic view illustrating an electric circuit of the control device.
Figure 3:
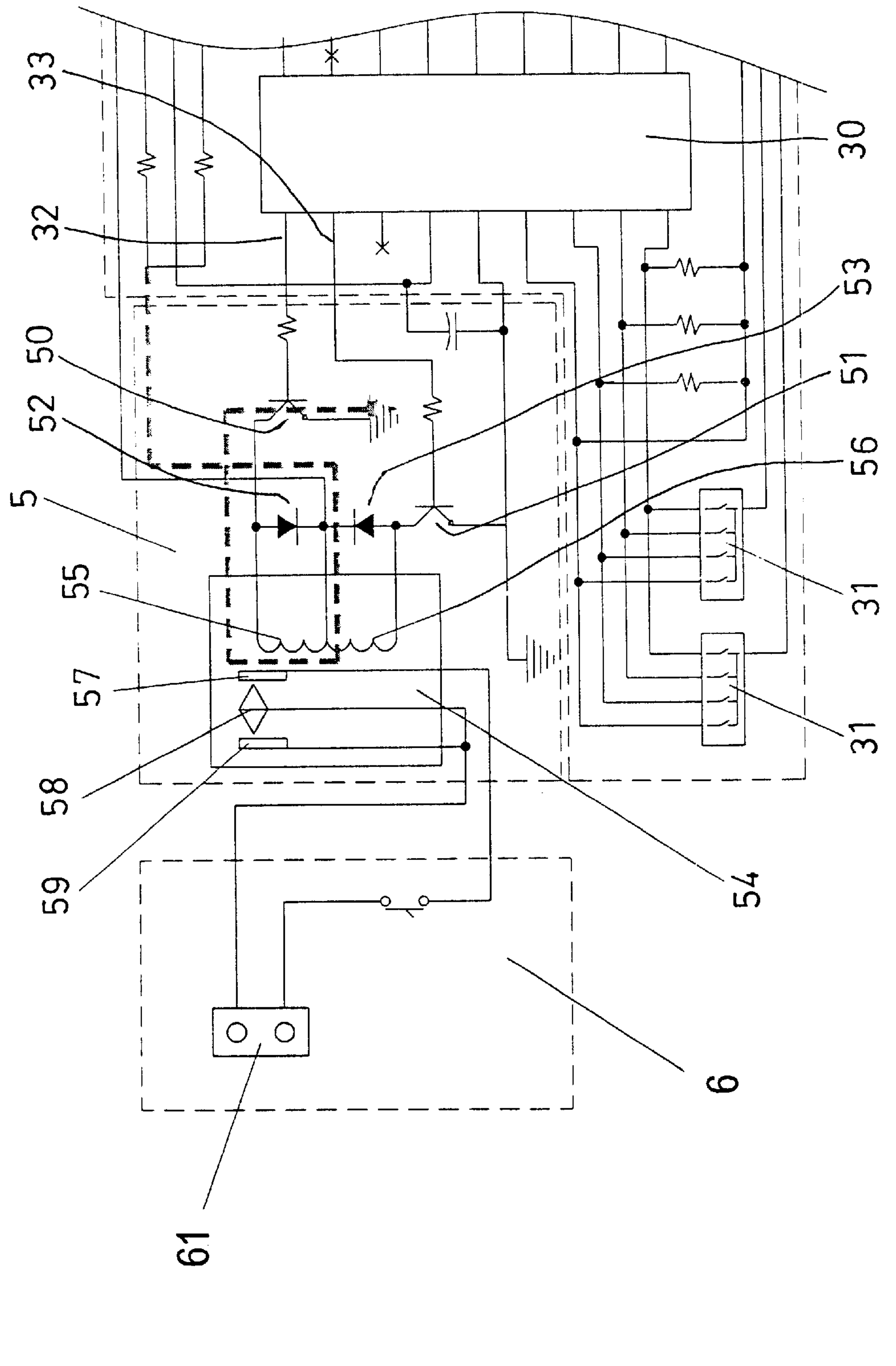
FIGS. 3, 4 are schematic views illustrating a portion of the electric circuit of the control device, and illustrating the operation of the electric circuit of the control device.
Figure 4:
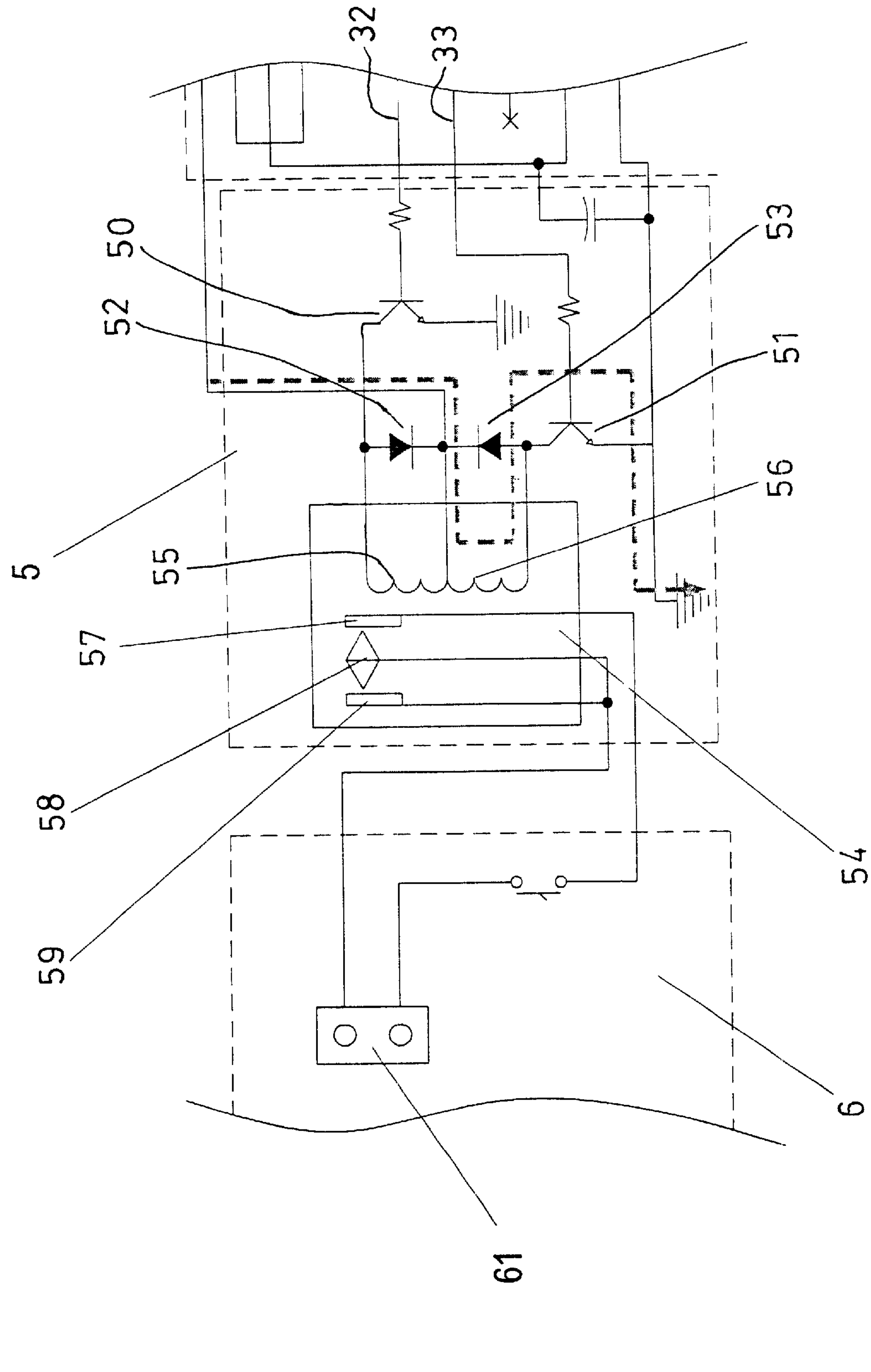

Referring to the drawings, and initially to FIGS. 1 and 2, a switch or control device in accordance with the present invention comprises a processor device or unit 3 including one or more integrated circuits or processor devices 30, and one or more encoders 31 coupled to the processor device 30. The processor device 30 includes two or more outputs or terminals 32, 33 (FIGS. 2–4). A receiver device or unit, such as a remote receiver unit 2 is coupled to the processor unit 3 for receiving remote control signals and for amplifying and/or rectifying the remote control signals, and for supplying the signals to the processor device 30.

A switching device 7, such as a manual switching device 7 may further be provided and may include one or more switches 71, 72 coupled to the processor unit 3 for controlling the processor device 30, or for supplying the "on" and "off" signals to the processor device 30, in order to control a relay device or unit 5 which will be described hereinafter. The encoders 31 of the processor unit 3 may be used for comparing or obtaining or receiving the received control signals. A power device or unit 4 includes such as one or more batteries coupled to the receiver unit 2, the processor unit 3, and/or the relay unit 5, for energizing these units 2, 3, 5.

The relay unit 5 includes two transistors 50, 51 having the bases coupled to the terminals 32, 33 of the processor device 30 respectively, two diodes 52, 53 coupled between the collectors of the transistors 50, 51, and a relay device 54 having two coils, such as two induction coils 55, 56 coupled parallel to the diodes 52, 53, or coupled in series between the transistors 50, 51. The relay device 54 includes two terminals 57, 58 coupled to a loaded apparatus 61 of a load device or unit 6, and another terminal 59 coupled between the loaded apparatus 61 and the terminal 58 of the relay device 54.

In operation, as shown in FIG. 3, when the processor device 30 sends out an "on" signal to the output terminal 32, the transistor 50 may be actuated, and the coil 55 may be energized, in order to force the terminal 58 to electrically couple or contact with the terminal 57, by the electromagnetic force generated by the coil 55, for example. At this moment, the electric circuit to the loaded apparatus 61 of the load unit 6 may be completed, and the loaded apparatus 61 may be energized at this moment.

On the contrary, as shown in FIG. 4, when the processor device 30 sends out an "off" signal to the other output terminal 33, the other transistor 51 may be actuated, and the coil 56 may be energized, in order to force the terminal 58 to electrically couple or contact with the other terminal 59, by the electromagnetic force generated by the coil 56, for example. At this moment, the electric circuit to the loaded apparatus 61 of the load unit 6 will be opened, and the loaded apparatus 61 may not be energized or may be switched off at this moment. The load unit 6 may be coupled to and energized by the other power source, such as the alternative current power source (FIG. 1).

It is to be noted that the diodes 52, 53 are disposed in different directions, or are disposed against each other, for preventing shortage from being formed by reverse current flows. When the transistors 50, 51 of the relay unit 5 are switched or are alternatively actuated, less electric power of the power unit 4 will be consumed, such that the working life of the power unit 4 may be increased. The receiver unit 2 or the switching device 7 may be used as a device or a means for supplying a control signal to the processor unit 3.

Figure 5:
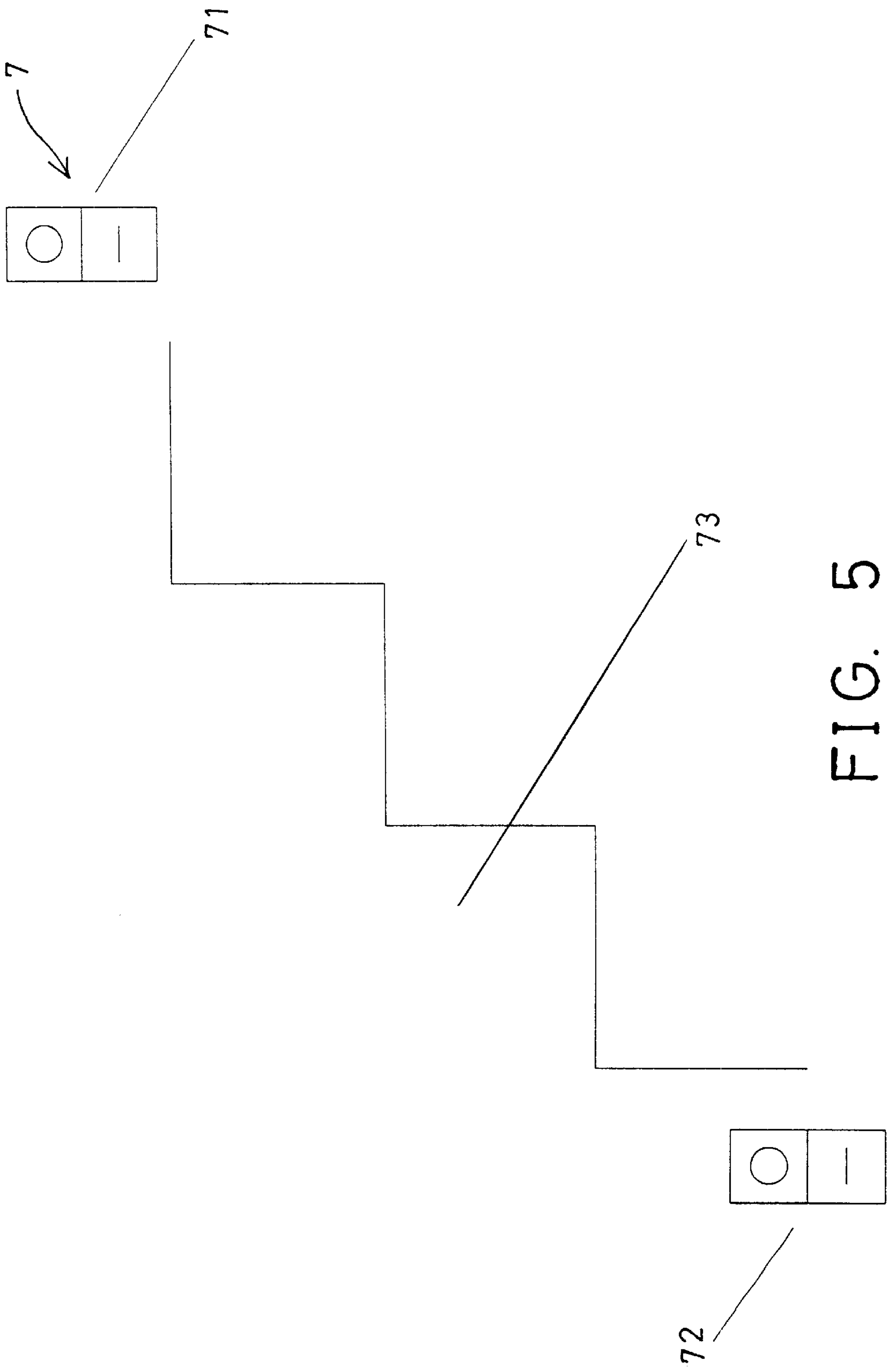
FIGS. 5, 6 are schematic views illustrating the operation of the electric circuit of the control device.
Figure 6:
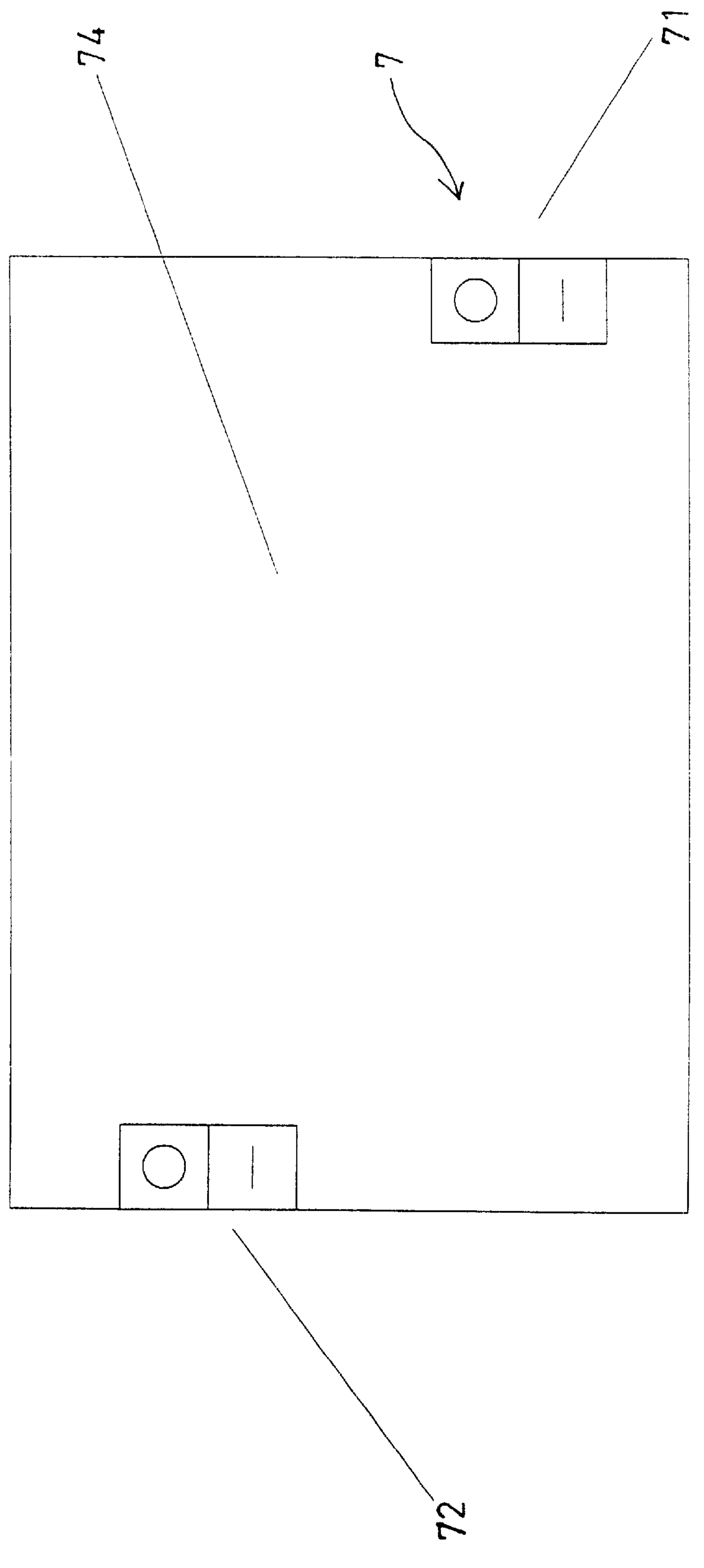

The switches 71, 72 of the switching device 7 may be coupled parallel to each other, and may be disposed on the upper portion and the lower portion of a ladder 73 respectively, as shown in FIG. 5; or may be disposed on the opposite doors of a building or housing 74 respectively, as shown in FIG. 6, in order to control the processor unit 3 via either the switches 71, 72 disposed on the upper portion or the lower portion of the ladder 73, or via either the switches 71, 72 disposed on the opposite sides of the housing 74.

Accordingly, the switch or control device in accordance with the present invention may be used for coupling to and for controlling the loaded apparatuses with less power required.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A control device comprising:

a processor unit, means for supplying control signals to said processor unit, a relay unit coupled to said processor unit, a power unit coupled to said processor unit and said relay unit for energizing said processor unit and said relay unit, a load unit coupled to said relay unit, for being switch on and switch off by said relay unit with the control signals supplied to said processor unit by said supplying means, and said relay unit including a first and a second transistors coupled to said processor unit, for being actuated by said processor unit, said first transistor of said relay unit being actuateable by said processor unit to switch on said load unit, and said second transistor being selectively actuateable by said processor unit to switch off said load unit when said first transistor of said relay unit is not actuated, for decreasing consuming of electric power.

2. The control device according to claim 1, wherein said processor unit includes a first and a second terminals, said first and said second transistors each includes a base coupled to said first and said second terminals of said processor unit respectively.

3. The control device according to claim 1, wherein said relay unit includes a first and a second coils coupled in series between said first and said second transistors.

4. The control device according to claim 3, wherein said first and said second transistors each includes a collector coupled to said first and said second coils.

5. The control device according to claim 3, wherein said relay unit includes a first and a second diodes coupled parallel to said first and said second coils.

6. The control device according to claim 5, wherein said first and said second diodes are disposed opposite to each other.

7. The control device according to claim 3, wherein said processor unit includes a first and a second terminals, said relay unit includes a third and a fourth terminals coupled to said load unit, and a fifth terminal coupled to said second terminal, said third and said fourth terminals are arranged to be forced and coupled together by said first transistor and said first coil, and said fourth and said fifth terminals are arranged to be forced and coupled together by said second transistor and said second coil.

8. The control device according to claim 1, wherein said control signal supplying means includes a receiver unit coupled to said processor unit, for receiving and sending the control signals to said processor unit.

9. The control device according to claim 1, wherein said control signal supplying means includes a switch device coupled to said processor unit, for sending the control signals to said processor unit.

10. The control device according to claim 9, wherein said switch device includes a first switch and at least one second switch coupled to said processor unit, for sending the control signals to said processor unit.

* * * * *